(12) United States Patent
Wang et al.

(10) Patent No.: US 10,361,477 B2
(45) Date of Patent: Jul. 23, 2019

(54) ANTENNA AND MOBILE TERMINAL HAVING THE SAME

(71) Applicant: BYD COMPANY LIMITED, Shenzhen (CN)

(72) Inventors: Yijin Wang, Shenzhen (CN); Lianhua Li, Shenzhen (CN); Faping Wang, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 73 days.

(21) Appl. No.: 15/561,577

(22) PCT Filed: Mar. 28, 2016

(86) PCT No.: PCT/CN2016/077488
§ 371 (c)(1),
(2) Date: Sep. 26, 2017

(87) PCT Pub. No.: WO2016/155591
PCT Pub. Date: Oct. 6, 2016

(65) Prior Publication Data
US 2018/0090819 A1    Mar. 29, 2018

(30) Foreign Application Priority Data
Mar. 31, 2015    (CN) .......................... 2015 1 0145639

(51) Int. Cl.
*H01Q 1/24* (2006.01)
*H01Q 5/371* (2015.01)
(Continued)

(52) U.S. Cl.
CPC ............... *H01Q 1/243* (2013.01); *H01Q 1/44* (2013.01); *H01Q 1/521* (2013.01); *H01Q 5/371* (2015.01); *H01Q 13/10* (2013.01); *H04M 1/0283* (2013.01)

(58) Field of Classification Search
CPC .......... H01Q 1/24; H01Q 1/241; H01Q 1/242; H01Q 1/243; H01Q 1/44; H01Q 5/307;
(Continued)

(56) References Cited

U.S. PATENT DOCUMENTS

| 8,766,858 B2 * | 7/2014 | Li | H01Q 1/2266 |
| | | | 343/702 |
| 9,048,538 B2 * | 6/2015 | Sung | H01Q 1/243 |

(Continued)

FOREIGN PATENT DOCUMENTS

| CN | 101828304 | 9/2010 |
| CN | 102074803 A | 5/2011 |

(Continued)

*Primary Examiner* — Daniel Munoz
*Assistant Examiner* — Patrick R Holecek
(74) *Attorney, Agent, or Firm* — DLA Piper LLP (US)

(57) ABSTRACT

An antenna and a mobile terminal having the same are provided. The antenna includes: a metal shell having a first slot, penetrated through the metal shell, extending in a transverse direction of the metal shell, having two ends which are closed; and a second slot, penetrated through the metal shell, extending in a longitudinal direction of the metal shell, having a first end communicated with the first slot and a second end extending to an edge of the metal shell and opened thereat; an exciting sheet disposed at an inner side of the metal shell, covering the first slot in a width direction thereof; a dielectric filling layer disposed between the exciting sheet and the metal shell, configured to fill the first and second slots; and an expanding resonance branch, disposed on a surface of the dielectric filling layer facing away from the metal shell, connected to the exciting sheet.

18 Claims, 6 Drawing Sheets

(51) Int. Cl.
*H01Q 1/44* (2006.01)
*H01Q 13/10* (2006.01)
*H01Q 1/52* (2006.01)
*H04M 1/02* (2006.01)

(58) Field of Classification Search
CPC ........ H01Q 5/314; H01Q 5/335; H01Q 5/357; H01Q 5/371; H01Q 5/378; H01Q 13/10; H01Q 1/2258; H01Q 1/2266; H01Q 13/103; H01Q 13/106; H01Q 13/16; H01Q 13/18; H01Q 5/321
See application file for complete search history.

(56) References Cited

U.S. PATENT DOCUMENTS

| | | | |
|---|---|---|---|
| 9,450,291 B2 | 9/2016 | Korva et al. | |
| 9,583,835 B2 * | 2/2017 | Lin | H01Q 9/04 |
| 10,069,194 B2 * | 9/2018 | Cai | H01Q 1/243 |
| 2009/0256766 A1 | 10/2009 | Bury | |
| 2010/0188294 A1 | 7/2010 | Chung et al. | |
| 2010/0245197 A1 | 9/2010 | Kerselaers | |
| 2013/0169497 A1 | 7/2013 | Wong et al. | |
| 2014/0176378 A1 | 6/2014 | Yu et al. | |
| 2017/0149116 A1 | 5/2017 | Cai et al. | |

FOREIGN PATENT DOCUMENTS

| | | |
|---|---|---|
| CN | 102904003 A | 1/2013 |
| CN | 103531908 A | 1/2014 |
| CN | 103579754 | 2/2014 |
| CN | 103904414 A | 7/2014 |
| CN | 104134857 | 11/2014 |
| CN | 203950905 | 11/2014 |
| KR | 10-2011-0125560 A | 11/2011 |
| KR | 10-2014-0095808 A | 8/2014 |

* cited by examiner

ANTENNA AND MOBILE TERMINAL HAVING THE SAME

CROSS-REFERENCE TO RELATED APPLICATION

This application claims priority to and benefits of Chinese Patent Application Serial No. 201510145639.3, filed with the State Intellectual Property Office of P. R. China on Mar. 31, 2015, the entire content of which is incorporated herein by reference.

TECHNICAL FIELD

This disclosure relates to a communication equipment field, and more particularly to an antenna and a mobile terminal having the same.

BACKGROUND

A known antenna can consist of a first slot and a second slot positioned at a communication area of a shell, a dielectric substrate and a microstrip feeding part. The first slot is arranged in parallel to the second slot. The first slot is used to radiate a first frequency bandwidth signal, the second slot is used to radiate a second frequency bandwidth signal whose frequency is higher than that of the first frequency bandwidth signal, the dielectric substrate covers the first slot and the second slot, and the microstrip feeding part is used to excite the radiation of the first and second slots.

Since the frequency signal is radiated only by the slots, the frequency signal has a limited bandwidth, and the two slots can only individually generate two resonances and radiate two different frequency bandwidth signals that cannot meet the requirements of ultra-wideband technology communication in the 4G era. In addition, the slot cannot be used as a sound transmission hole in the frequency communication, thus not only affecting the appearance of the mobile terminal, but also tending to bring in dust.

SUMMARY

We provide an antenna having a plurality of advantages such as a wide frequency bandwidth to meet communication requirements of 2G, 3G and 4G, a neat and beautiful appearance, a good dustproof performance and so on.

We further provide a mobile terminal having the antenna.

Our antennae may include: a metal shell provided with a first slot, penetrated through the metal shell, extending in a transverse direction of the metal shell and having a first end and a second end thereof, the first end and the second end being closed; and a second slot, penetrated through the metal shell, extending in a longitudinal direction of the metal shell, having a first end communicated with the first slot and a second end extending to an edge of the metal shell and opened thereat; an exciting sheet disposed at an inner side of the metal shell, and covering the first slot in a width direction of the first slot; a dielectric filling layer disposed between the exciting sheet and the metal shell, and configured to fill the first slot and the second slot; and an expanding resonance branch, disposed on a surface of the dielectric filling layer facing away from the metal shell, and connected to the exciting sheet.

Our antennae have a plurality of advantages, such as a wide frequency bandwidth to meet communication requirements of 2G, 3G and 4G, a neat and beautiful appearance, a good dustproof performance and so on.

In addition, our antennae for a mobile terminal may further have following additional technical features:

The first slot and the second slot may be disposed adjacent to one edge of the metal shell.

The first slot may be disposed adjacent to an upper edge of the metal shell, the second slot has a lower end communicated with the first slot and an upper end extending to the upper edge of the metal shell and opened thereat.

The width of the first slot may be about 0.5 mm to about 5 mm.

The width of the second slot may be about 0.5 mm to about 5 mm.

The distance between the second slot and the first end of the first slot may be about 52 mm to about 72 mm in the transverse direction of the metal shell.

The distance between the second slot and the second end of the first slot may be about 15.5 mm to about 25.5 mm in the transverse direction of the metal shell.

The exciting sheet may include: a first branch extending in the transverse direction of the metal shell, disposed between the first slot and one edge of the metal shell adjacent to the first slot in the longitudinal direction of the metal shell; and a second branch extending in the transverse direction of the metal shell, connected to the first branch, having a width larger than a width of the first branch, and covering the first slot in the width direction of the first slot.

The antenna may further include a matching network disposed at the inner side of the metal shell, and connected to the exciting sheet and the metal shell respectively.

The matching network may connect to the second branch.

The second branch may be provided with a feeding signal access point configured to connect with a signal wire.

The distance between the exciting sheet and an inner surface of the metal shell may be about 0.5 mm to about 2 mm.

The dielectric filling layer includes: an isolating part disposed between the metal shell and the exciting sheet; a first filling part connected to the isolating part and configured to fill the first slot; and a second filling part connected to the isolating part and configured to fill the second slot.

The isolating part may have a notch configured to receive a signal wire.

The dielectric filling layer may be formed in an integration molding manner.

The dielectric filling layer may be made of plastic having a dielectric constant less than 3.

The expanding resonance branch may connect to the exciting sheet via an inductor element or a capacitor element.

The expanding resonance branch may extend in the transverse direction of the metal shell, and have a length of about 15 mm to about 25 mm.

We also provide a mobile terminal. The mobile terminal includes the antennae.

The mobile terminal has a plurality of advantages such as a good antenna performance, a neat and beautiful appearance, a good dustproof performance and so on.

BRIEF DESCRIPTION OF THE DRAWINGS

These and other aspects and advantages will become apparent and more readily appreciated from the following descriptions made with reference to the drawings.

REFERENCE NUMERALS antenna 1, metal shell 10, first slot 11, second slot 12, exciting sheet 20, first branch 21, second branch 22, feeding signal access point 23, signal wire 24, dielectric filling layer 30, isolating part 31, first filling part 32, second filling part 33, notch 34, matching network 40, expanding resonance branch 50, inductor element or capacitor element 51.

DETAILED DESCRIPTION

Reference will be made in detail to examples. The examples described herein with reference to drawings are explanatory, illustrative, and used to generally understand the disclosure. The examples shall not be construed to limit this disclosure. The same or similar elements and the elements having same or similar functions are denoted by like reference numerals throughout the descriptions.

An exemplary antenna will be described below referring to drawings. A transverse direction of a metal shell 10 is represented by arrow A in FIGS. 1 to 3, and a longitudinal direction of the metal shell 10 is represented by arrow B in FIGS. 1 to 4. An upper and lower direction herein refers to a vertical direction, and an inner and outer direction herein refers to an inner and outer direction in which a mobile terminal including the antenna 1 is normally used.

As shown in FIGS. 1-6, the antenna includes a metal shell 10, an exciting sheet 20, a dielectric filling layer 30, a matching network 40 and an expanding resonance branch 50.

The metal shell 10 is provided with a first slot 11 extending in the transverse direction of the metal shell 10 and a second slot 12 extending in the longitudinal direction of the metal shell 10. Both the first slot 11 and the second slot 12 are penetrated through the metal shell 10 along a thickness direction of the metal shell 10 respectively. The first slot 11 has a first end and a second end thereof, the first end and the second end are closed, and the second slot 12 has a first end communicated with the first slot 11 and a second end extending to an edge of the metal shell 10 and opened thereat. In other words, the first slot 11 and the second slot 12 intersects with each other to form a T shape. The exciting sheet 20 is disposed at an inner side of the metal shell 10, and covers the first slot 11 in a width direction of the first slot 11. The width direction of the first slot 11 refers to an extending direction of a short edge of the first slot 11. The dielectric filling layer 30 is disposed between the exciting sheet 20 and the metal shell 10, and fills the first slot 11 and the second slot 12. The matching network 40 is disposed at the inner side of the metal shell 10, and connected to the exciting sheet 20 and the metal shell 10 respectively. The expanding resonance branch 50 is disposed on a surface of the dielectric filling layer 30 facing away from the metal shell 10, and connected to the exciting sheet 20.

The antenna uses the metal shell 10 as a radiant surface, which may prevent the antenna signal from being shielded and thus improve the space utilization of the antenna.

Moreover, in some examples, since the metal shell 10 is provided with the first slot 11 and the second slot 12 intersecting with each other to form the T shape, the expanding resonance branch 50 is disposed on the dielectric filling layer 30, and the exciting sheet 30 is provided to be combined with the matching network 40, the performance of the antenna 1 may be effectively improved, and the antenna 1 may cover multiple frequency bands. In some embodiments, an edge of the metal shell 10 adjacent to the first slot 11 is separated into a first resonance branch L1 and a second resonance branch L2 by the second slot 12, i.e., the first resonance branch L1 and the second resonance branch L2 belong to the metal shell 10 and are delimited by the first slot 11 and the second slot 12. The first resonance branch L1 is excited by the exciting sheet 20 in a couple feeding manner, so as to generate a resonance to cover a low frequency band (about 791 MHz to 960 MHz), then the second resonance branch L2, the first resonance branch L1 and the exciting sheet 20 may be coupled together, and further, the expanding resonance branch 50 may generate an additional resonance to expand a high frequency broadband to obtain a high frequency band (about 1710 MHz to 2690 MHz), and thus the antenna has a wide frequency bandwidth. In other words, the antenna mainly relies on the slots and the formed resonance branches to radiate and on the exciting sheet 20 to communicate, rather than just relies on the slots.

The first slot 11 and the second slot 12 are filled by the dielectric filling layer 40 which is formed in an integration molding manner, thus not only isolating the exciting sheet 20 from the metal shell 10, but also beautifying the appearance of the mobile terminal while preventing dust from entering.

Figure 7:
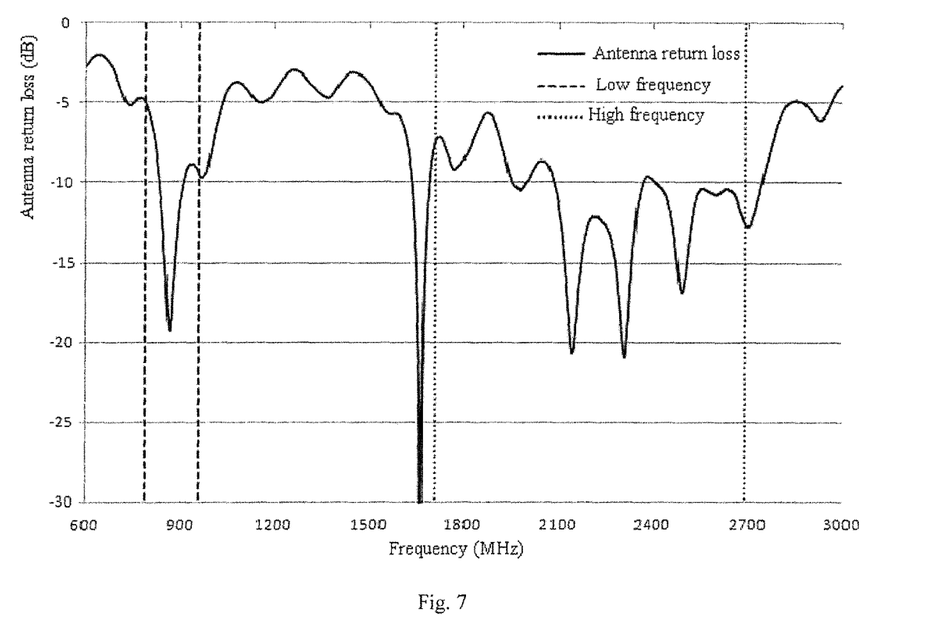
FIG. 7 is a diagram showing a frequency band of an antenna.

As shown in FIG. 7, by testing the frequency band of the antenna 1, it indicates that the performance of the antenna 1 is excellent. Therefore, the antenna 1 may cover a wide communication frequency band, and generates a plurality of resonances in both low and high frequency bands, rather than only one resonance in each of the low and high frequency bands respectively, which may expand the frequency bandwidth to cover Wireless Wide Area Network (WWAN) and Long Term Evolution (LTE) frequency bands. Thus, the antenna 1 shows a wide frequency bandwidth to meet the communication requirements of 2G, 3G and 4G, a neat and beautiful appearance, a good dustproof performance and so on.

The antenna according to specific examples will be described below referring to drawings.

In some specific examples, as shown in FIGS. 1-6, the antenna includes the metal shell 10, the exciting sheet 20, the dielectric filling layer 30, the matching network 40 and the expanding resonance branch 50.

Figure 1:
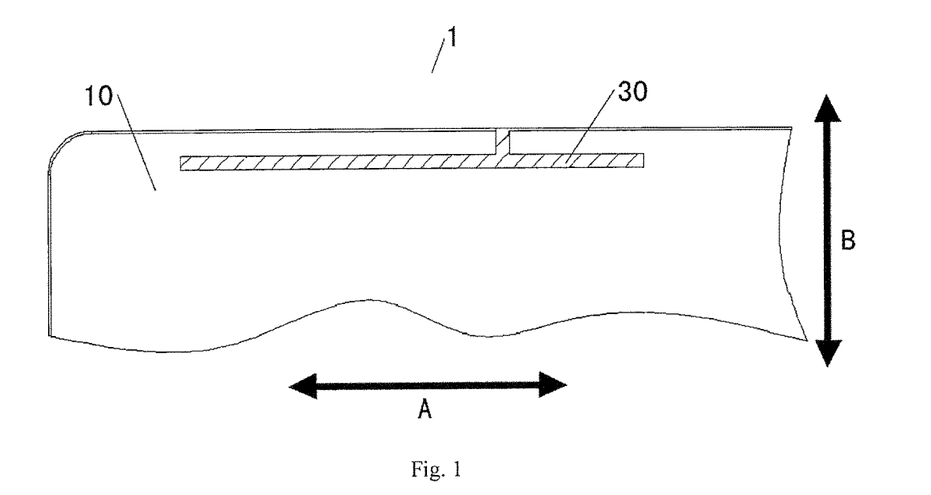
FIG. 1 is a schematic view of an antenna from an outer side of a metal shell of the antenna.
Figure 2:
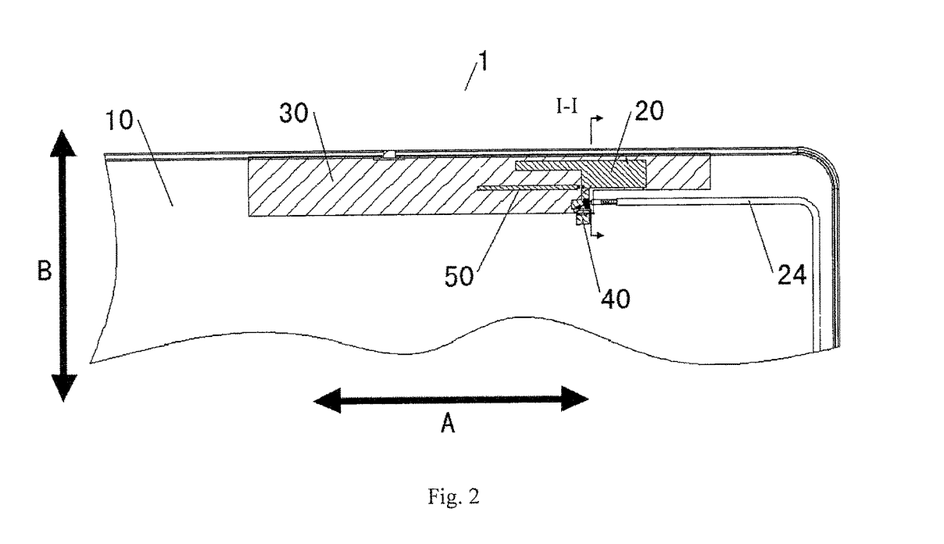
FIG. 2 is a schematic view of an antenna from an inner side of a metal shell of the antenna.
Figure 3:
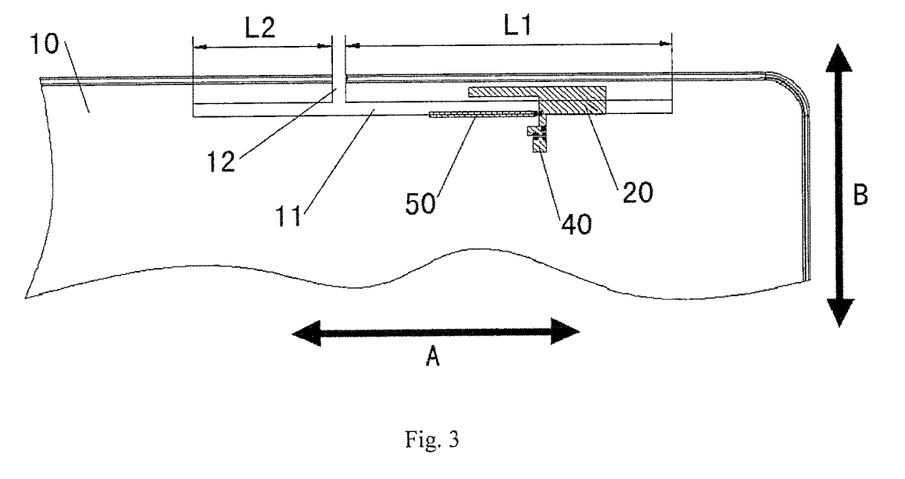
FIG. 3 is a schematic view of an antenna from an inner side of a metal shell of the antenna, in which a dielectric filling layer is not shown.
Figure 4:
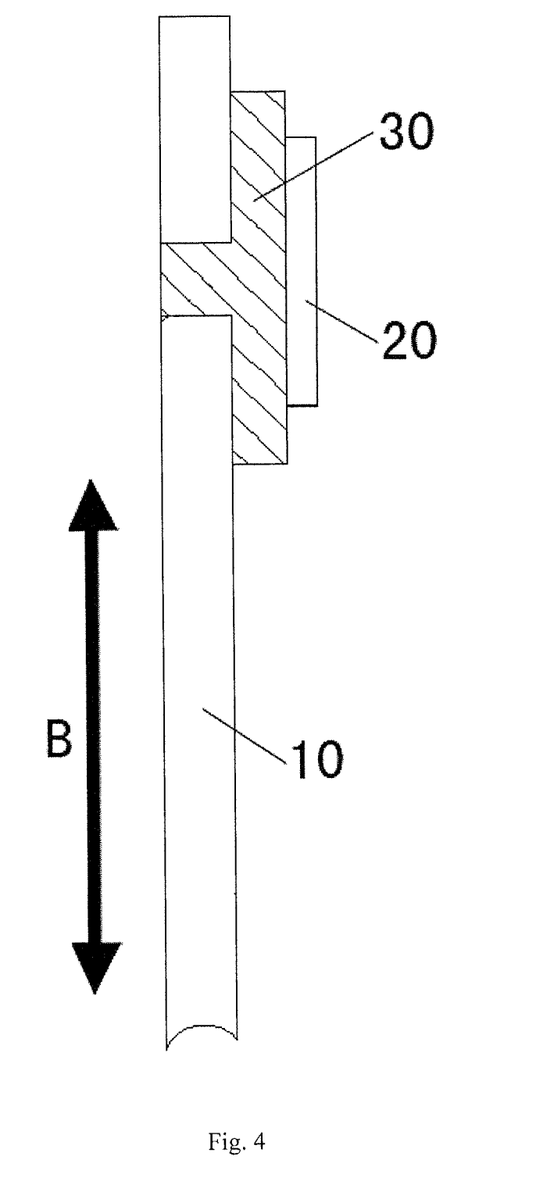
FIG. 4 is a sectional view of an antenna along section line I-I in FIG. 2.

As shown in FIGS. 1 to 3, the first slot 11 and the second slot 12 may be arranged adjacent to one edge of the metal shell 10 to evade a liquid crystal display (LCD) of the mobile terminal.

The first slot may be disposed adjacent to an upper edge of the metal shell 10. The upper and lower direction refers to an upper and lower direction in which the mobile terminal including the antenna 1 is normally used. As mentioned before, the upper and lower direction herein refers to the vertical direction. The second slot 12 has a lower end communicated with the first slot 11, and an upper end extending to the upper edge of the metal shell 10 and opened thereat.

Alternatively, the width of the first slot 11 is about 0.5 mm to about 5 mm. The width of the first slot 11 may be about 2.5 mm. Also, the width of the second slot 12 may be about 0.5 mm to about 5 mm. The width of the second slot 12 may be about 2.5 mm.

The distance between the second slot 12 and the first end of the first slot 11 may be about 52 mm to about 72 mm in the transverse direction of the metal shell 10. The distance between the second slot 12 and the first end of the first slot 11 may be about 62 mm in the transverse direction of the metal shell 10. The distance between the second slot 12 and the second end of the first slot 11 may be about 15.5 mm to about 25.5 mm in the transverse direction of the metal shell 10. The distance between the second slot 12 and the second end of the first slot 11 may be about 20.5 mm in the transverse direction of the metal shell 10. In other words, the length of the first resonance branch L1 may be about 52 mm to about 72 mm, preferably 62 mm, and a length of the second resonance branch L2 may be about 15.5 mm to about 25.5 mm, preferably is 20.5 mm.

The lengths of the first resonance branch L1 and the second resonance branch L2 may be reasonably adjusted according to the performance of the antenna 1.

Figure 6:
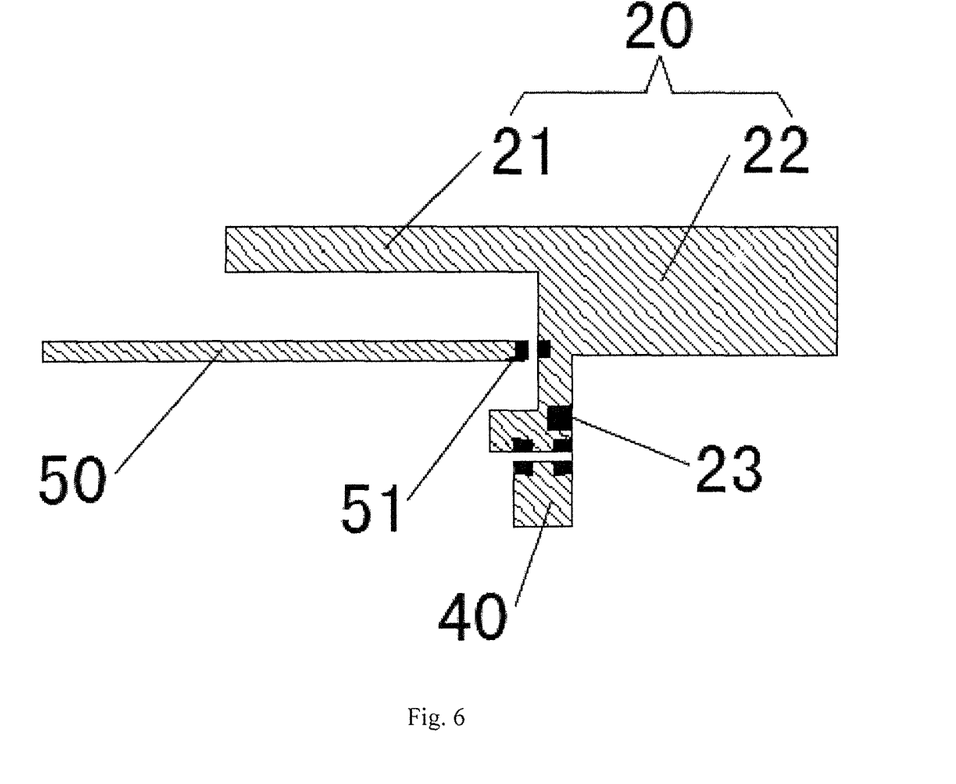
FIG. 6 is a schematic view of an exciting sheet, a matching network and an expanding resonance branch of an antenna.

As shown in FIGS. 2, 3 and 6, the first slot 11 is separated into a short part and a long part by the second slot 12, and the exciting sheet 20 is disposed adjacent to the long part of the first slot 11. In other words, the exciting sheet 20 is disposed adjacent to the first resonance branch L1.

The exciting sheet 20 may include a first branch 21 and a second branch 22. The first branch 21 extends in the transverse direction of the metal shell 10. The first branch 21 is disposed between the first slot 11 and one edge of the metal shell 10 adjacent to the first slot 11 in the longitudinal direction of the metal shell 10. The first branch 21 may be disposed between the first slot 11 and the upper edge of the metal shell 10. The second branch 22 extends in the transverse direction of the metal shell 10 and connected to the first branch 21. The second branch 22 has a width larger than that of the first branch 21 and covers the first slot 11 in the width direction of the first slot 11. The matching network 40 may connect to the second branch 22. The second branch 22 may be provided with a feeding signal access point 23 configured to connect with a signal wire 24 (such as a coaxial cable). Thus, an exciting effect of the exciting sheet 20 may be ensured.

The distance between the exciting sheet 20 and an inner surface of the metal shell 10 may be about 0.5 mm to 2 mm. The distance between the exciting sheet 20 and the inner surface of the metal shell 10 may be about 0.6 mm.

A position relationship between the first branch 21 and the second slot 12 may be set according to actual applications and needs. An example in which the first branch 21 is separated from the second slot 12 is shown in the drawings.

Figure 5:
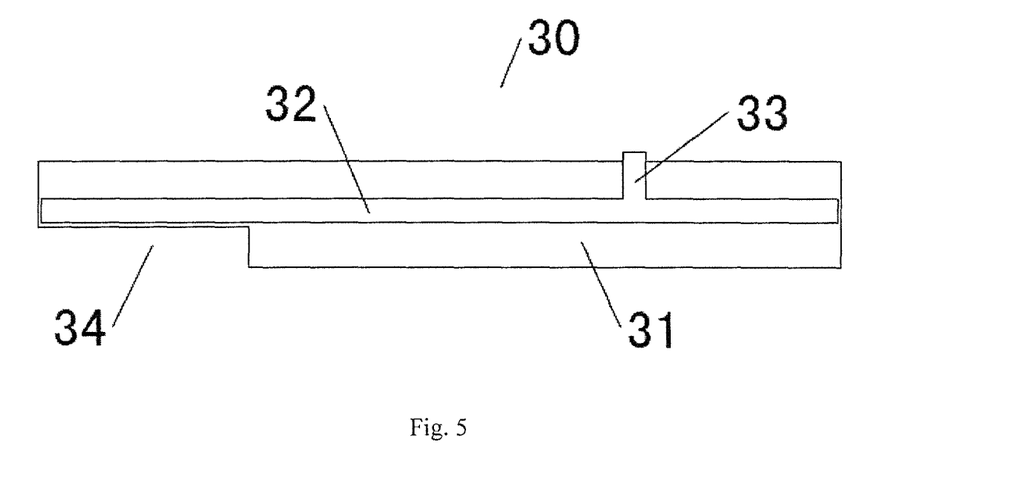
FIG. 5 is a schematic view of a dielectric filling layer of an antenna.

As shown in FIG. 5, the dielectric filling layer 30 includes an isolating part 31, a first filling part 32, and a second filling part 33. The isolating part 31 is disposed between the metal shell 10 and the exciting sheet 20 for isolating the metal shell 10 from the exciting sheet 20. In some embodiments, the isolating part 31 has a notch 34 configured to receive the signal wire 24. The first filling part 32 connects to the isolating part 31 and used for filling the first slot 11. The second filling part 33 connects to the isolating part 31 and used for filling the second slot 12. As mentioned above, the distance between the exciting sheet 20 and the inner surface of the metal shell 10 is about 0.5 mm to about 2 mm preferably about 0.6 mm. In other words, a width of the isolating part 31 is about 0.5 mm to about 2 mm, preferably about 0.6 mm.

To guarantee an isolation effect of the dielectric filling layer 30, the dielectric filling layer 30 is made of plastic having a dielectric constant less than 3.

As shown in FIG. 6, the expanding resonance branch 50 connects to the exciting sheet 20 via an inductor element or a capacitor element 51. The expanding resonance branch 50 may connect to the exciting sheet 20 via the inductor element.

The expanding resonance branch 50 may extend in the transverse direction of the metal shell 10, and have a length of about 15 mm to about 25 mm, preferably about 20 mm.

The length of the expanding resonance branch 50 may be adjusted according to an impedance of the antenna 1.

The mobile terminal will be described below. The mobile terminal may include the antenna 1 according to the above examples.

By using the antenna, the mobile terminal has a plurality of advantages such as a good antenna performance, a neat and beautiful appearance, a good dustproof performance and so on.

The mobile terminal may be a table personal computer, a laptop, a mobile phone and so on.

Other components and operations of the mobile terminal are known and will not be elaborated herein.

It is to be understood that terms such as "central," "longitudinal," "transverse," "length," "width," "thickness," "upper," "lower," "front," "rear," "left," "right," "vertical," "horizontal," "top," "bottom," "inner," "outer," "clockwise," and "counterclockwise" should be construed to refer to the orientation as then described or shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In this description, "a plurality of" means two or more than two, unless specified otherwise.

Unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

Unless specified or limited otherwise, a structure in which a first feature is "on" or "below" a second feature may include an example in which the first feature is in direct contact with the second feature, and may also include an example in which the first feature and the second feature are not in direct contact with each other, but are contacted via an additional feature formed therebetween. Furthermore, a first feature "on," "above," or "on top of" a second feature may include an example in which the first feature is right or obliquely "on," "above," or "on top of" the second feature, or just means that the first feature is at a height higher than that of the second feature; while a first feature "below," "under," or "on bottom of" a second feature may include an example in which the first feature is right or obliquely "below," "under," or "on bottom of" the second feature, or just means that the first feature is at a height lower than that of the second feature.

Reference throughout this specification to "another example," "an example," "a specific example," or "some examples," means that a particular feature, structure, material, or characteristic described in connection with the example is included in at least one example. Thus, the appearances of the phrases such as "in another example," "in an example," "in a specific example," or "in some examples," in various places throughout this specification are not necessarily referring to the same example. Furthermore, the particular features, structures, materials, or characteristics may be combined in any suitable manner in one or more examples.

Although explanatory examples have been shown and described, it would be appreciated by those skilled in the art that the above examples cannot be construed to limit this disclosure, and changes, alternatives, and modifications can be made in the examples without departing from spirit, principles and scope of this disclosure.

What is claimed is:

1. An antenna comprising:
   a metal shell provided with
   a first slot penetrated through the metal shell, extending in a transverse direction of the metal shell and having a first end and a second end thereof, the first end and the second end being closed; and
   a second slot penetrated through the metal shell, extending in a longitudinal direction of the metal shell, having a first end communicated with the first slot and a second end extending to an edge of the metal shell and opened thereat;
   an exciting sheet disposed at an inner side of the metal shell, and covering the first slot in a width direction of the first slot;
   a dielectric filling layer disposed between the exciting sheet and the metal shell, and configured to fill the first slot and the second slot; and
   an expanding resonance branch disposed on a surface of the dielectric filling layer facing away from the metal shell, and connected to the exciting sheet via an inductor element or a capacitor element.

2. The antenna according to claim 1, wherein the first slot and the second slot are disposed adjacent to one edge of the metal shell.

3. The antenna according to claim 1, wherein the first slot is disposed adjacent to an upper edge of the metal shell, the second slot has a lower end communicated with the first slot and an upper end extending to the upper edge of the metal shell and opened thereat.

4. The antenna according to claim 1, wherein a width of the first slot is about 0.5 mm to about 5 mm.

5. The antenna according to claim 1, wherein a width of the second slot is about 0.5 mm to about 5 mm.

6. The antenna according to claim 1, wherein a distance between the second slot and the first end of the first slot is about 52 mm to about 72 mm in a transverse direction of the metal shell.

7. The antenna according to claim 6, wherein a distance between the second slot and the second end of the first slot is about 15.5 mm to about 25.5 mm in the transverse direction of the metal shell.

8. The antenna according to claim 1, wherein the exciting sheet comprises:
   a first branch extending in the transverse direction of the metal shell and disposed between the first slot and one edge of the metal shell adjacent to the first slot in the longitudinal direction of the metal shell; and
   a second branch extending in the transverse direction of the metal shell and connected to the first branch, having a width larger than a width of the first branch, and covering the first slot in the width direction of the first slot.

9. The antenna according to claim 8, further comprising a matching network disposed at the inner side of the metal shell, and connected to the exciting sheet and the metal shell respectively.

10. The antenna according to claim 9, wherein the matching network connects to the second branch.

11. The antenna according to claim 8, wherein the second branch is provided with a feeding signal access point configured to connect with a signal wire.

12. The antenna according to claim 1, wherein a distance between the exciting sheet and an inner surface of the metal shell is about 0.5 mm to about 2 mm.

13. The antenna according to claim 1, wherein the dielectric filling layer comprises:
   an isolating part disposed between the metal shell and the exciting sheet;
   a first filling part connected to the isolating part and configured to fill the first slot; and
   a second filling part connected to the isolating part and configured to fill the second slot.

14. The antenna according to claim 13, wherein the isolating part has a notch configured to receive a signal wire.

15. The antenna according to claim 13, wherein the dielectric filling layer is formed in an integration molding manner.

16. The antenna according to claim 1, wherein the dielectric filling layer is made of plastic having a dielectric constant less than 3.

17. The antenna according to claim 1, wherein the expanding resonance branch extends in the transverse direction of the metal shell, and has a length of about 15 mm to about 25 mm.

18. A mobile terminal comprising the antenna according to claim 1.

* * * * *